(12) United States Patent
Pastor et al.

(10) Patent No.: US 10,372,307 B2
(45) Date of Patent: Aug. 6, 2019

(54) DETERMINING ACTIVE REAL OBJECTS FOR RUNNING A SOFTWARE APPLICATION

(75) Inventors: Alain Pastor, Nozay (FR); Cedric Mivielle, Nozay (FR)

(73) Assignee: Alcatel Lucent, Nozay (FR)

( * ) Notice: Subject to any disclaimer, the term of this patent is extended or adjusted under 35 U.S.C. 154(b) by 714 days.

(21) Appl. No.: 13/983,985

(22) PCT Filed: Feb. 9, 2012

(86) PCT No.: PCT/EP2012/052200
§ 371 (c)(1),
(2), (4) Date: Oct. 22, 2013

(87) PCT Pub. No.: WO2012/107517
PCT Pub. Date: Aug. 16, 2012

(65) Prior Publication Data
US 2014/0040829 A1    Feb. 6, 2014

(30) Foreign Application Priority Data
Feb. 11, 2011   (FR) ...................................... 11 51105

(51) Int. Cl.
*G06F 3/0484* (2013.01)
*G06F 1/16* (2006.01)
(Continued)

(52) U.S. Cl.
CPC ........ *G06F 3/04842* (2013.01); *G06F 1/1686* (2013.01); *G06F 1/1694* (2013.01);
(Continued)

(58) Field of Classification Search
CPC ........................... G06F 3/0481; H04L 12/2803
(Continued)

(56) References Cited

U.S. PATENT DOCUMENTS

2002/0035404 A1\* 3/2002 Ficco .................. H04L 12/2803
                                                                700/65
2004/0163073 A1  8/2004 Krzyzanowski et al.
(Continued)

FOREIGN PATENT DOCUMENTS

CN        101854739 A     10/2010
FR        2 939 996 A1     6/2010
(Continued)

OTHER PUBLICATIONS

Costello, S. (Feb. 8, 2009). Getting and Installing Programs from the iPhone App Store. Retrieved May 4, 2015, from http://web.archive.org/web/20090208123657/http://ipod.about.com/od/theappstore/ss/use_app_store.htm.\*
(Continued)

*Primary Examiner* — Abdullah Al Kawsar
*Assistant Examiner* — David V Luu
(74) *Attorney, Agent, or Firm* — Fay Sharpe LLP

(57) ABSTRACT

A communication terminal (T) equipped with a means of processing (TRT) designed to allow the use of software applications and equipped with an interface (INT) for communicating with a communication network (N), said means of processing comprising at least: •A first module (MZG) designed to delimit a geographical zone (ZG) based on a curve described in space by the communication terminal, •A second module (MOR) designed to determine a set of active real objects (O1, 02) located in this zone and having an interface (Int1, Int2) with the communication network, •A third module (MIA) designed to identify an application in relation to the active real objects, •A fourth module (MDA) designed to interface the application with the previously determined active real objects.

17 Claims, 3 Drawing Sheets

(51) Int. Cl.
*G06F 3/01* (2006.01)
*G06F 3/0346* (2013.01)
*G06F 3/0481* (2013.01)
*H04W 4/00* (2018.01)
*H04W 4/02* (2018.01)
*H04W 4/021* (2018.01)
*H04L 29/08* (2006.01)
*H04W 4/029* (2018.01)
*H04W 4/70* (2018.01)
*H04L 29/06* (2006.01)
*H04W 4/04* (2009.01)

(52) U.S. Cl.
CPC .............. *G06F 3/011* (2013.01); *G06F 3/014* (2013.01); *G06F 3/017* (2013.01); *G06F 3/0346* (2013.01); *G06F 3/04815* (2013.01); *H04L 67/02* (2013.01); *H04L 67/025* (2013.01); *H04L 67/12* (2013.01); *H04L 67/125* (2013.01); *H04L 67/16* (2013.01); *H04L 67/18* (2013.01); *H04W 4/00* (2013.01); *H04W 4/02* (2013.01); *H04W 4/022* (2013.01); *H04W 4/023* (2013.01); *H04W 4/026* (2013.01); *H04W 4/029* (2018.02); *H04W 4/043* (2013.01); *H04W 4/70* (2018.02); *H04L 67/38* (2013.01)

(58) Field of Classification Search
USPC .......................................... 715/835
See application file for complete search history.

(56) References Cited

U.S. PATENT DOCUMENTS

| | | | |
|---|---|---|---|
| 2007/0028266 A1* | 2/2007 | Trajkovic et al. | 725/46 |
| 2009/0315766 A1 | 12/2009 | Khosravy et al. | |
| 2009/0319181 A1 | 12/2009 | Khosravy et al. | |
| 2010/0233961 A1* | 9/2010 | Holden | G06F 13/385 455/41.3 |
| 2010/0312817 A1* | 12/2010 | Steakley | G06F 8/61 709/202 |
| 2010/0318929 A1* | 12/2010 | Hilton | G06F 3/0486 715/769 |

FOREIGN PATENT DOCUMENTS

| | | |
|---|---|---|
| JP | 2007-517313 A | 6/2007 |
| WO | WO 2010/075455 A1 | 7/2010 |

OTHER PUBLICATIONS

Hans Gellersen et al., "Supporting device discovery and spontaneous interaction with spatial references," Personal and Ubiquitous Computing—special Issue: Mobile Spatial Interaction, vol. 13, No. 4, XP002662352, pp. 255-264, May 31, 2005.

Vlad Trifa et al., "Design of a Web-based Distributed Location-Aware Infrastructure for Mobile Devices," 8$^{th}$ IEEEE International Conference on Pervasive Computing and Communications Workshops, XP031679903, pp. 714-719, Mar. 29, 2010.

Dominique Guinard, "Interacting with the SOA-Based Internet of Things: Discovery, Query, Selection, and On-Demand Provisioning of Web Services," IEEE Transactions on Services Computing, vol. 3, No. 3, XP011303191, pp. 223-235, Jul. 1, 2010.

Sara Streng et al., "Using Spatial Conditions for Proactive Computing and Interaction Metaphors," Proceedings of the Third Easted International Conference on Human-Computer Interaction, XP 002662351, pp. 242-247, Mar. 31, 2008.

Minsu Kim et al., "Effective M2M Gateway Selection Algorithms for Geographical Region-based Query," International Conference on Information and Communication Technology Convergence (ICTC 2010), IEEE, XP031839966, pp. 413-414, Nov. 17, 2010.

Luigi Atzori et al., "The Internet of Things: A survey," Computer Networks, vol. 54, No. 15, XP027289940, pp. 2787-2805, Oct. 28, 2010.

International Search Report for PCT/EP2012/052200 dated Apr. 5, 2012.

* cited by examiner

FIG_1
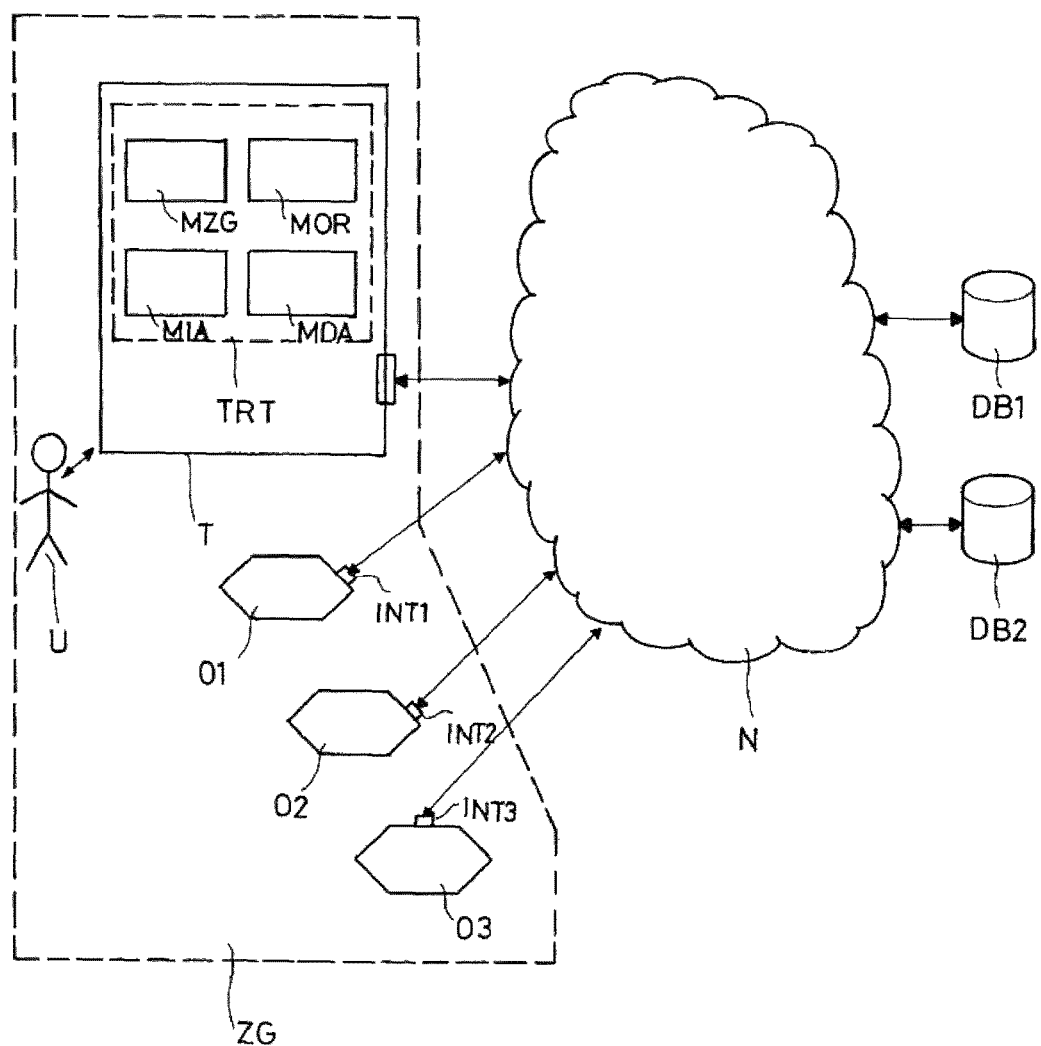

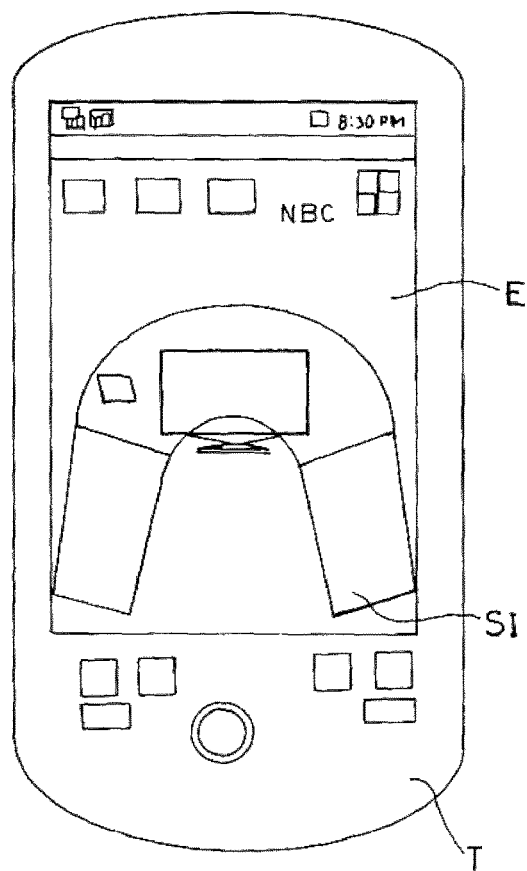
FIG_3b
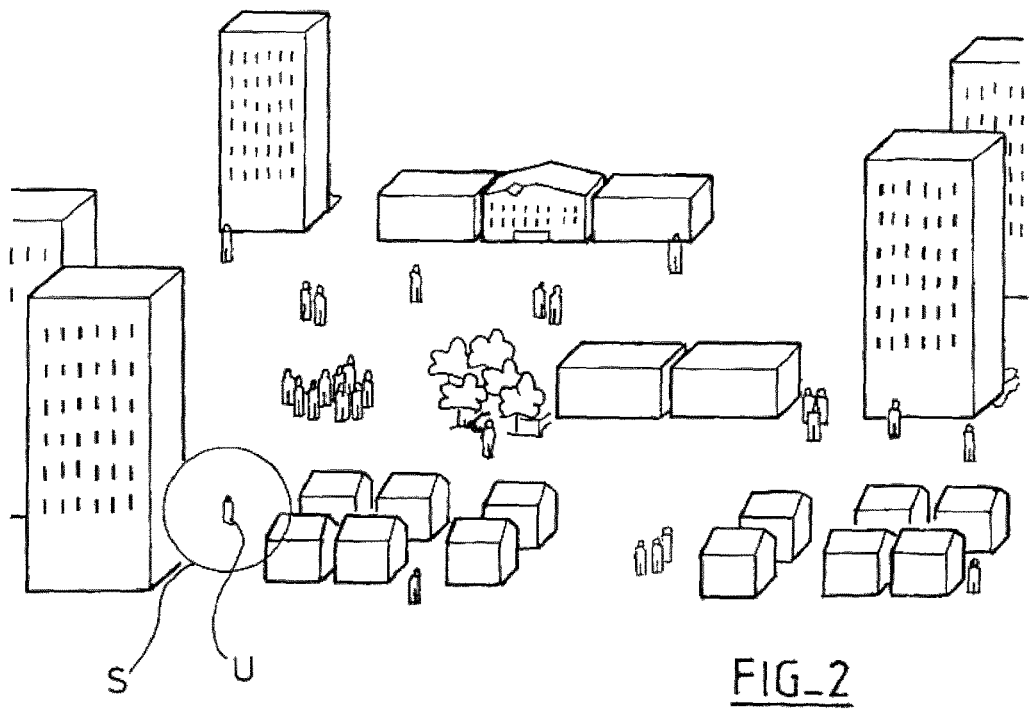
FIG_2

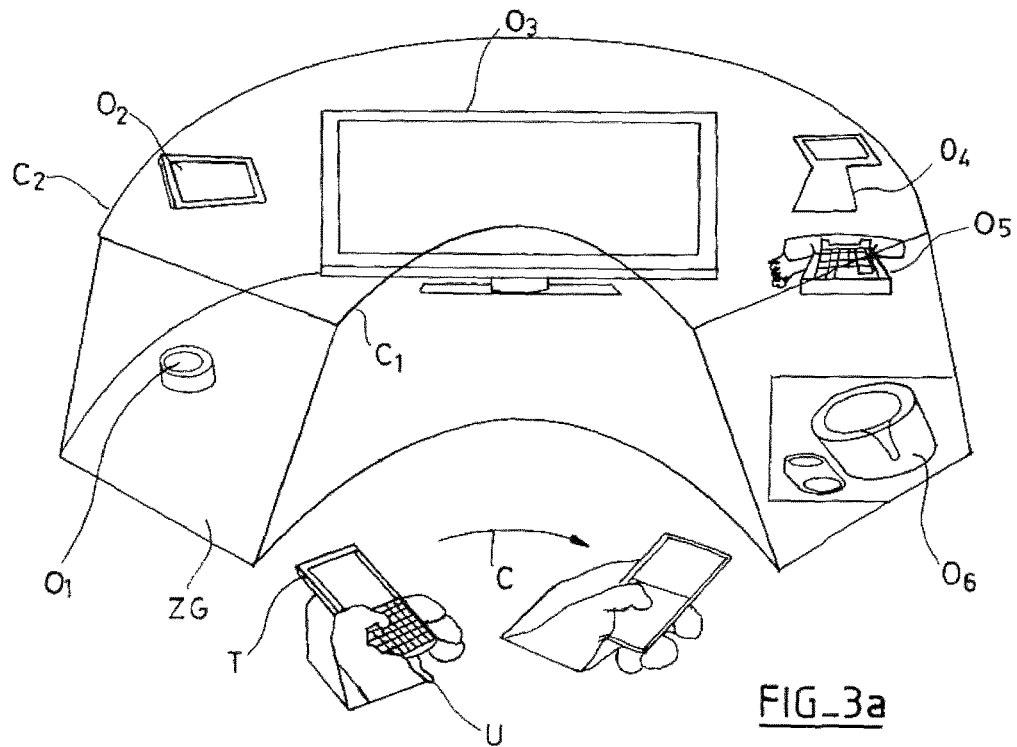
FIG_3a
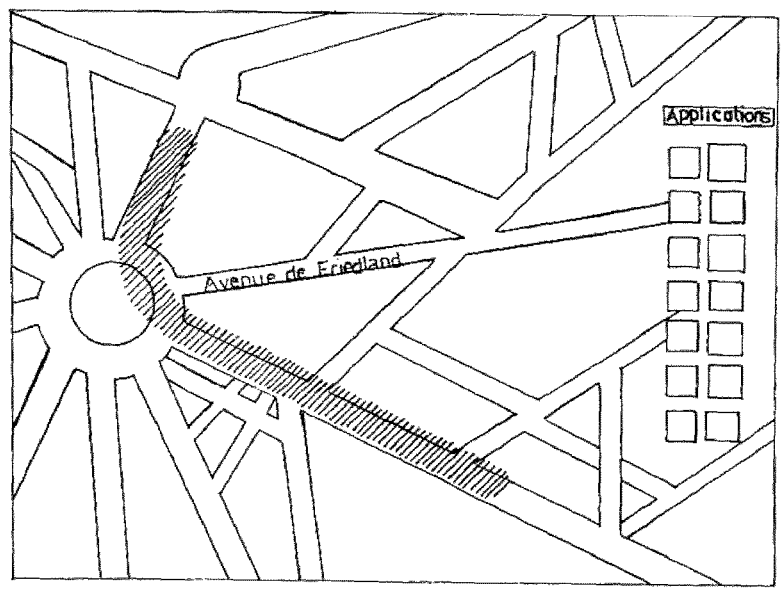
FIG_4

DETERMINING ACTIVE REAL OBJECTS FOR RUNNING A SOFTWARE APPLICATION

The present invention relates to the identification of a software application using real objects that have a communication interface with a communication network.

It concerns the object Internet, and more specifically, the "Object Web". These relatively new concepts have been the subject of various initiatives. The work described on the site www.webofthings.com started by two researchers from the University of Zurich can be cited as an example.

The "web of things" is also described in the article by D. Guinard and V. Trifa, "Towards the Web of Things: Web Mashups for Embedded Devices" in Proceedings of International WWW (World Wide Web) Conferences, Madrid, Spain, 2009.

The trend toward connecting physical objects to communication networks is also reported in the press release from IMS Research dated 19 Aug. 2010, "Internet Connected Devices About to Pass the 5 Billion Milestone". This press release is available at http://imsresearch.com/news-events/press-template.php?pr_id=1532&cat_id=108

It is possible to find the results of the work from these authors in other articles, such as, for example, "*Supporting Device Discovery and Spontaneous Interaction with Spatial References*", by Gellersen, Fischer, Guinard, Gostner, Kortuem, Kray, Rukzio and Streng, or, "*Using Spatial Conditions for Proactive Computing and Interaction Metaphors*" by Streng, Guinard and Gellerson, or "*Design of a Web-based Distributed Location-aware Infrastructure for Mobile Devices*" by Trifa, Guinard, Bolliger and Wieland.

These works on the Web of things aim to transform real life objects into resources available on the Web that may potentially communicate among each other through the invention: lamps, televisions, communication terminals, small household appliances, etc. may interface with the Internet, and the software applications available over it, and thus open up new possibilities.

Current solutions do not however allow the user to identify which real objects around him or her are connected to the Internet, thus making them unusable for running software applications.

Therefore, it is also not possible for the user to determine which software applications he or she may be able to use.

The present invention aims to resolve this technical problem.

Additionally, it is important that the solution does not inundate the user with information when he or she is surrounded by too large a number of active real objects. The present invention also takes this additional problem into account.

The invention's first object is a method to run a software application accessible from a communication terminal using at least one real object, comprising
  A step of describing a curve (C) in space with said communication terminal
  A step of identifying a geographic zone (ZG) based on this curve,
  A step of determining a set of active real objects located within this geographic zone having a communication interface with a communication network
  A step of identifying an application from among these active real objects
  A step of interfacing the application with the previously determined active real objects.

According to the embodiments of the invention, the delimitation step consists in automatically determining the position of the communication terminal using a locating device and determining the geographic zone in relation to this position.

The communication terminal can display the geographic zone being determined on the screen in real time.

The delimitation and determination steps can be carried out progressively and in parallel, so that the terminal displays the active real objects in the geographic zone being determined on the screen.

The determination step may consist of querying a first database associating real objects and geographic positions, and determining the set of active real objects by comparing the associated geographic positions in the database with the geographic zone.

The terminal may display at least part of the geographic zone on the screen and show the active real objects from among the set of active real objects corresponding to at least that one part using an augmented reality mechanism.

The identification step may include re-querying a second database associating the applications available with the required conditions, and determining a set of applications for which the associated required conditions correspond to the abilities offered by the real objects in the set.

It is possible to use an ontology to determine the required conditions and the applications corresponding to the abilities of the objects.

The set of applications may be provided to the terminal user so that he or she can select an application from this set of applications. This set of applications may be displayed on the terminal screen.

The second database may be created from the set of software applications actually installed on the terminal.

It may also include applications available from at least one application server.

The application may be run by using a subset of the set of active real objects, this subset being determined by a criterion of distance from the position of the communication terminal.

The application may be run by using a subset of the set of active real objects, this subset being determined by a criterion linked to the profile of the user of the communication terminal.

The delimitation step may be carried out by determining a path, and the determination, identification, and interface steps will then be carried out in relation to the location of the communication terminal along this path.

It is also an object of the invention to have a communication terminal equipped with processing means designed to allow the use of software applications and having an interface for communicating with a communication network, these means of processing comprising at least:
  A first module designed to determine a geographical zone based on a curve in space described by the communication terminal,
  A second module designed to determine a set of active real objects located in the geographic zone and having an interface with the communication network,
  A third module designed to identify an application in relation to the active real objects
  A fourth module designed to interface the application with the previously determined active real objects.

The third object of the invention is to have a man-machine interface for a communication terminal comprising a screen having the means to display a list of available applications that may be run on active real objects within a set of active real objects located in a geographic zone determined from the location of the communication terminal and the curve described by the communication terminal, and a means of interaction to allow a user to select an application from said list and to start the interface between the application and the previously determined active real objects.

The invention and its benefits will become more clearly apparent in the following description, with reference to the attached figures.

FIG. 1 shows a general architecture within which the invention may be incorporated.

FIG. 2 diagrams one implementation for the invention in which the User U is located outdoors.

FIGS. 3a and 3b diagram the description of a curve in space by user U's mobile terminal.

FIG. 4 diagrams an implementation in which user U uses a mapping application to define his or her path.

The communication terminal T shown in FIG. 1 has a means of processing TRT comprising several modules MZG, MIA, MOR, and MDA. Traditionally, these means of processing may include electronic circuits and an operating system designed to run software modules consisting of computer code.

The communication terminal also has an interface INT for communicating with a communication network N. The communication terminal T is preferably a mobile terminal and the interface is then a radio interface.

The communication network N is traditionally a composite network. It may be a radio access network (using 2G/3G/4G, Wi-Fi or other technologies), a private wired network, a public network, etc. The invention may be applied independently of the architecture of the communication network and the technologies used.

The real objects O1, O2 and O3 are connected to communication network N and have appropriate interfaces Int1, Int2, and Int3 respectively to allow them to communicate with network N. This communication may potentially take place through an adapter that may be embedded in the real objects themselves or may be a gateway between the real objects and the communication network.

These real objects may be of various types. They may be real objects available in a private home, in a work space (office, factory, workshop, etc.), in a public space (street, restaurant dining room, bar, etc.), etc. They may be a lamp, television screen, telephone, speaker, digital photo frame, media player (DVD, etc.), radio, clock, etc.

Some are complex real objects offering many functionalities (or abilities); for example, a television may offer a very large array of abilities on its interface with communication network N allowing complete remote control (channel changing, configuring brightness, contrast, adjusting volume, selecting a video signal enhancement, etc.)

Others are much simpler and may only offer very simple functionalities: for example, a lamp may offer an interface that only allows turning it on or off.

Delimitation of the Geographic Zone

The inventive method comprises a first step consisting of delimiting a geographic zone ZG. This step may be carried out by a software module MZG embedded in communication terminal T itself.

Preferably, the position of the communication terminal is automatically determined by a locating device. This locating device may be a GPS (Global Positioning System) system embedded in the terminal itself, but other techniques may also be foreseen. For example, a software module may also be designed to calculate a location from the position of known base stations and a triangulation algorithm.

The geographic zone may then be determined in relation to this position and a curve described by the communication terminal.

According to one implementation, the user uses his or her mobile terminal to describe a curve in space. The geographic zone is determined by this curve. Such an implementation is depicted in FIG. 3a. The user U describes a curve C with his or her terminal T. The curve may be determined by the software module MZG using various technologies. In particular, the mobile terminal may have a motion sensor to determine a good estimate of the curve actually described in space.

It is also possible to consider only the location of the terminal at the start and end of the movement to determine an approximation C of the real curve. This curve C may then be a straight line linking these two locations or potentially a curve C determined from these two end points and a model of a typical hand movement.

From this curve C, a geographic zone may be determined.

In this example, the geographic zone ZG is a volume found between two cylindrical sections. The two cylinders C1 and C2 are centred on the centre of curve C. The diameter of the interior cylinder C1 may be the distance calculated or estimated between the centre of the curve C and the geographic position of the mobile terminal T. The diameter of the exterior cylinder C2 may be configurable.

Other geographic zone shapes are of course possible, and the shape used may be potentially selected by the user.

For usage in a limited space, the geographic zone ZG may have no other markers than the physical limit of the space. In the example in FIG. 3a, the geographic zone ZG may not be restricted by the exterior cylinder C2 but by the space in the room (which is to say by the furniture or the wall that one can imagine behind the user).

In order to help the user to capture the geographic zone, the mobile terminal, may display the geographic zone being determined on the screen in real time. Thus, the user can accurately know which part of the space he or she has captured with his or her motion. FIG. 3b shows a communication terminal T equipped with a screen E showing the same scene as the one in FIG. 3a. This scene was captured using a video camera integrated into terminal T. By overlaying this scene, the geographic zone ZG is also shown, for example, in the shape of a greyed-out area, thus allowing the user to see whether or not the geographic zone ZG actually corresponds to his or her intention. Thus he or she can correct his or her motion and know when to stop it to capture the ideal zone.

The geographic zone ZG may be memorised in a memory linked to communication terminal T or user U. In this way, it is possible to reuse the same geographic zone ZG when the terminal and/or user encounters the same situation, without having to carry out the steps described above again. Determining a geographic zone may thus consist of searching the memory for one that corresponds to the current situation.

For example, when the user sits at his or her desk, always in the same place with more or less the same real objects present around him or her, the geographic zone ZG may be directly recovered from the user profile.

Geographic zones ZG may be indexed by the position of the communication terminal (thus, one knows that the user is at his or her desk), or by other information in the user profile, and in particular by his or her status as it may appear in the presence database on the communication network.

As for the active real objects, they may be re-determined in the sense that their status may have changed between two visits to the same geographic area (objects turned off, battery spent, or possibly the installation of a new object).

Determining a Set of Active Real Objects

The inventive method then comprises a second step consisting of determining a set of active real objects located in the previously determined geographic zone. These active real objects have a communication interface with a communication network.

This second step may be carried out by software module MOR embedded in terminal T itself.

Here an "active" object is a real object actually able to communicate with the communication network. To do this, some objects may need to be connected to a power supply, turned on, or appropriately configured.

The steps of determining active real objects and delimiting the geographic zone may be carried out progressively. As the geographic zone is delimited, the corresponding active objects are determined and may thus be presented to the user so that he or she can dynamically act upon the determination of the geographic zone. If there are a sufficient number of real objects "captured", he or she may terminate delimitation of the geographic zone, or if there are not a sufficient number, he or she may continue delimitation until achieving a satisfactory result. This implementation can thus help save time in a situation in which the user does not necessarily wish to cover all of his or her environment, but rather to rapidly obtain a sufficient environment to run certain applications.

In the example in FIG. 3a, he or she may describe curve C until a sufficient number of active real objects are detected.

These real objects may be presented to the user in various ways.

For example, they may be presented in the form of a list showing an identifier (which could be a description configured by the user), a type, potentially a graphic icon, etc. This list may be updated dynamically as mobile terminal T travels along curve C.

It may also display at least part of the geographic zone ZG on the screen E of terminal T, indicating the active objects in this part using an augmented reality mechanism. Concretely, in the example in FIG. 3b, the screen E shows the environment as captured by a video camera (or potentially a digital camera) integrated into terminal T. As an overlay on this realistic view, the man-machine interface may show the geographic zone ZG (or a part of this geographic zone) and indicator signs SI showing the locations of the active real objects detected.

These indicator signs SI may simply show that an active real object is present, or provide additional semantic information, for example by indicating the type of object. These indicator signs SI may be icons or other graphic symbols.

In order to determine the active real objects present, several implementations are possible.

A database DB1 may be provided to reference the available real objects. This database may link the real objects with their geographic position. It may for example contain records linking real object identifiers with characteristics (types, abilities offered, etc.), states (active/inactive), and geographic positions.

The geographic position may consist of a longitude/latitude pair. It may also comprise an altitude.

One can then determine the set of active real objects by sending a query to database DB1 containing the characteristics of geographic zone ZG. A search engine may for example compare the geographic positions of the real objects present in database DB1 and geographic zone ZG.

If geographic zone ZG is determined by a curve C traced by terminal T, such a query may be sent after the end of the movement is detected and geographic zone ZG is completely determined. Alternatively, a query may be sent at each time quantum in order to show the detected real objects to the user in real time.

For the sake of optimisation, it may also be designed to carry out a first query of a general database DB1 at the start of the process based on a global geographic zone forming a superset of possible geographic zones. In the case of the example in FIG. 3a, this global zone may be the entire room, as regardless of curve C, the geographic zone ZG may never exceed the limits of the room. Then, the search engine can carry out its queries only on the results of this first query. This implementation is especially interesting when the active real objects detected are shown in real time on the screen E.

Identifying an Application

The inventive method comprises a third step consisting of identifying an application in relation to the active real objects that were determined. This step may be carried out by a third module MIA embedded in communication terminal T.

This application identification module MIA may query a second database DB2. This database can link the available applications with required conditions.

Database DB2 may cover only the software applications already installed on communication terminal T. In this configuration, database DB2 may be embedded in terminal T itself. This implementation allows the user to implement his or her own well identified applications depending up on the context in which he or she finds herself at a given time.

Alternatively, database DB2 may be separate from communication terminal T and may contain a larger set of available software applications. This is the implementation depicted in FIG. 1. The objective is thus to offer the user software applications that he or she does not necessarily use habitually (and of which he or she may not be aware) but which can be run with the detected real objects.

More concretely, database DB2 may contain descriptions of software applications and in particular the conditions that they require.

In one embodiment, these required conditions may be of two types: interface input points that require an incoming information flow, and interface output points that require the ability to transmit an outgoing information flow.

Alternatively, the required conditions may be types of objects that must be present (or potentially as options) to run the application.

These descriptions may also comprise other information about the applications. Some of this information may be designed to be shown to the user U to help him or her identify the application or to have some information to decide whether to install or select it.

The descriptions may for example be in XML language (Extensible Markup Language) as in the simplified example below.

```
<application id="lift">
  <attrs>
    <attr name="state"><value>disable</value></attr>
    <attr name="configured"><value>no</value></attr>
    <attr name="name"><value>Lift Application</value></attr>
    <attr name="image"><value>appli_lift.png</value></attr>
    <attr name="description"><value>The Lift Application allows you
to prompt on a screen the caller name and to flash a lamp when your
```

-continued

```
phone rings</value></attr>
    <attr name="creator"><value>Monique</value></attr>
    <attr name="rate"><value>4.5</value></attr>
    <attr name="price"><value>$2</value></attr>
    <attr name="nbvo"><value>3</value></attr>
    <attr name="vo_1_kind"><value>
        <div class="rwobject"><span class=
"kind">phone</span></div>
        </value></attr>
    <attr name="vo_2_kind"><value>
        <div class="rwobject"><span class=
"kind">lamp</span></div>
        </value></attr>
    <attr name="vo_3_kind"><value>
        <div class="rwobject"><span class=
"kind">screen</span></div>
        </value></attr>
    </attrs>
<application>
```

This example is a description of an application called "Lift" that makes a lamp to flash and displays the caller's name on a screen upon receiving an incoming telephone call.

Therefore, this application activates three real objects, as indicated in the last three <attr> attributes: a telephone ("phone"), a lamp ("lamp"), and a screen ("screen"). The preceding attributes give other information such as the application name, the name of its author, an image, and a description (designed to be displayed on the screen of terminal T), its price, etc.

Other implementations of an application description are given in the patent application filed on 10 Jan. 2011 under filing number 1150178, and which is incorporated by reference to this patent application.

The application identification module MIA may use these descriptions to determine the application or applications whose required conditions correspond to the abilities offered by the previously determined real objects.

To continue with the example above, if it was determined that a telephone, a lamp, and a screen are active and located in the geographic zone, the "Lift" application may be proposed to the user U.

To do this, the identifiers shown in the application descriptions may be mapped to the ability identifiers for the real objects. The latter may be saved and queried in database DB1. Alternatively, it is also possible to directly query the detected objects that have a suitable interface to return their abilities.

The mapping may be carried out using ontologies. These ontologies can help overcome differences in vocabulary. Depending upon the language, producer, etc. similar objects may have different descriptions; and applications may also indicate their required conditions using different vocabularies. Therefore it is necessary to map the descriptions according to their semantic value.

These ontologies may be available on the web or embedded locally in communication terminal T. In the latter case, updates may be planned to incorporate upgrades, new producers, new equipment, new applications, etc.

The ontologies may be described in various ways, according to various models, in particular RDF schema, or OWL which came out of work by the W3C (WWW Consortium).

Here again, patent application number 1150178 describes the various possible mechanisms in greater detail.

In this way, the application identification module can determine the set of applications whose required conditions correspond to the abilities offered by the detected real objects.

This set may be presented to mobile terminal user U to allow him or her to select one (or more) application(s). They may be presented in the form of a list on the screen E of communication terminal T showing the application names, potentially with an icon or graphical representation.

The applications may be sorted to show the user the applications already installed on communication terminal T separate from those in the Internet cloud.

Application Interfacing

Lastly, the inventive method comprises a fourth step consisting of interfacing the software application with the active real objects.

This step may be partially implemented by an application interfacing module MDA in the means of processing TRT on mobile terminal T.

The selected application (or selected applications) may be implemented by interfacing it (them) with a subset of the set of active real objects detected. In fact, it is entirely possible that several active real objects of the same type may be detected while only one is necessary to implement the invention. In the example using the "lift" application described above, there may for example be several lamps available while the application only needs to make one flash.

Thus it is possible to determine this subset using a distance criterion. The application interfacing module MDA may in fact calculate the distance between communication terminal T and each of the detected real objects and determine the closest real object of a given type. It is then possible to decide that the closest object is preferable, as this is the choice that provides the maximum visibility, and a priori relevance for user U.

It is also possible to determine this subset using a criterion linked to the profile of user U. The application interfacing module MDA may query a database of user profiles to search for user U's preferences and in particular to identify his or her favourite objects. These favourite objects may be determined individually; for example, when at home, user U may prefer to have a specific lamp, always the same one, flash, even if it is not the closest one. The preferences may also cover a category of objects.

Of course, other possibilities are possible, such as for example the selection of the object consuming the least energy.

FIG. 4 shows an implementation in which user U uses a mapping application.

Delimitation of a geographic zone may therefore be carried out by determining a path on a map. This determination may be carried out before the actual movement of terminal T.

The steps of determining a set of active real objects, identifying an application, and interfacing with this application are then carried out in relation to the location of the terminal along this path.

For example, these steps may be carried out periodically: at each period, the location of terminal T is recalculated, and triggers the sequence of these steps.

For the selection of active real objects to be used for an application from among those possible, it may be interesting to save those already used, where possible. Thus, rather than using the closest object, one could use the one that was used before until either it is no longer in the geographic zone in question, or until its distance exceeds a certain threshold in relation to a new object. This implementation allows switching to a new object when the old one becomes too far away, but it is also important to avoid switching from one object to another too often. Also, the movement direction may be taken into account to favour the selection of an object in front of user U rather than behind him or her.

The invention claimed is:

1. A method to run a software application accessible from a communication terminal using at least one real object, said method comprising:
   describing a curve in space from said communication terminal;
   identifying a geographic zone based on said curve;
   determining, by the communications terminal, a set of active real objects located within said geographic zone having a communication interface with a communication network;
   identifying, by the communications terminal, an application that is compatible with at least one of said active real objects by querying a database associating available applications with required conditions, said query indicating abilities offered by the active real objects, and determining a set of applications for which associated required conditions correspond to abilities offered by the real objects in said set; and
   interfacing said application with said active real objects.

2. The method according to claim 1, wherein said identifying of said geographic zone includes automatically determining a position of said communication terminal using a locating device and determining said geographic zone in relation to said position.

3. The method according to claim 1, further comprising:
   displaying by said communication terminal a representation of said geographic zone being determined on an associated screen in real time.

4. The method according to claim 1 in which said identifying of said geographic zone and said determining are carried out progressively and in parallel and said method further comprises: said terminal displaying a representation of the active real objects in the geographic zone being determined on a screen.

5. The method according to claim 1 in which said determining includes querying an object location database associating real objects and geographic positions, and determining said set of active real objects by comparing the associated geographic positions in said database with geographic positions within said geographic zone.

6. The method according to claim 1 further comprising:
   said terminal displaying a representation of at least part of said geographic zone on a screen and displaying active real objects from among said set of active real objects using an augmented reality mechanism.

7. The method according to claim 1 further comprising using an ontology to determine the required conditions for said applications that correspond to the abilities of said objects.

8. The method according to claim 1 further comprising:
   providing said determined set of applications to an associated user of said communication terminal to help the user select an application from among said determined set of applications.

9. Method according to claim 8 further comprising:
   displaying said determined set of applications on a screen of said communication terminal.

10. The method according to claim 7 in which said database is formed from information regarding a set of applications currently installed on said communication terminal.

11. The method according to claim 7 in which said database comprises information regarding applications available on at least one application server.

12. The method according to claim 1 further comprising:
    running said identified application by using a subset of said set of active real objects, said subset being determined by a criterion of a distance from a position of said communication terminal.

13. The method according to claim 1 further comprising:
    running said identified application by using a subset of said set of active real objects, said subset being determined by a criterion linked to a profile of an associated user of said communication terminal.

14. The method according to claim 1 in which said identifying of said geographic zone comprises:
    determining a path, and said determining said set of active real objects, said identifying said application, and interfacing said application being carried out in relation to a location of said communication terminal along said path.

15. A communication terminal comprising:
    a processor; and
    an interface for communicating with an associated communication network;
    said processor being configured as:
      a first module designed to delimit a geographical zone based on a curve described in space by said communication terminal;
      a second module designed to determine a set of active real objects located in said geographic zone and having a communication interface with said communication network;
      a third module designed to identify an application that is compatible with at least one of said active real objects, by querying a database associating the applications available with required conditions, and by the determination of a set of applications for which the associated required conditions correspond to abilities offered by the real objects in said set; and
      a fourth module designed to interface said identified application with said determined active real objects.

16. A man-machine interlace for a communication terminal comprising:
    a screen configured to display a list of available applications that may be run using active real objects within a set of active real objects located in a geographic zone determined, by the communication terminal, based on a location of said communication terminal and a curve described in space by a movement of said communication terminal by an associated user of said communication terminal, and
    a user input device configured to receive a user selection of an application from said displayed list; and
    an object activator configured to start an interface between said selected application and said determined active real objects, wherein said application is identified by querying a database associating the applications available with required conditions, said query indicating abilities offered by the active real objects, and by the determination of a set of applications for which the associated required conditions correspond to abilities offered by the real objects in said set.

17. A non-transitory computer readable medium carrying instructions which when executed by a processor cause the processor to perform the method according to claim 1.

* * * * *